(12) United States Patent
Zhu et al.

(10) Patent No.: US 12,281,429 B1
(45) Date of Patent: Apr. 22, 2025

(54) INTEGRATED MOLDED STRUCTURE OF OUTER TUB AND DIRECT DRIVE MOTOR STATOR OF DRUM WASHING MACHINE

(71) Applicant: HEFEI MELONI INTELLIGENT TECHNOLOGY CO., LTD., Hefei (CN)

(72) Inventors: Hongyu Zhu, Hefei (CN); Andong Song, Heifei (CN)

(73) Assignee: HEFEI MELONI INTELLIGENT TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 18/834,548

(22) PCT Filed: Jun. 12, 2024

(86) PCT No.: PCT/CN2024/098591
§ 371 (c)(1),
(2) Date: Jul. 30, 2024

(51) Int. Cl.
*D06F 37/26* (2006.01)
*D06F 37/02* (2006.01)
*D06F 37/30* (2020.01)

(52) U.S. Cl.
CPC ............ *D06F 37/262* (2013.01); *D06F 37/02* (2013.01); *D06F 37/304* (2013.01); *D06F 37/264* (2013.01)

(58) Field of Classification Search
CPC ...... D06F 37/02; D06F 37/262; D06F 37/264; D06F 37/304
See application file for complete search history.

(56) References Cited

U.S. PATENT DOCUMENTS

| | | | | |
|---|---|---|---|---|
| 2007/0113596 A1* | 5/2007 | Kim | ....................... | D06F 37/262 68/140 |
| 2009/0064726 A1* | 3/2009 | Choi | ...................... | D06F 37/269 68/140 |
| 2009/0199599 A1* | 8/2009 | Choi | ...................... | D06F 37/206 68/140 |
| 2012/0240637 A1* | 9/2012 | Lim | ........................ | D06F 37/304 68/140 |
| 2013/0200747 A1* | 8/2013 | Bang | ....................... | D06F 37/304 310/254.1 |
| 2013/0205842 A1* | 8/2013 | Kim | ........................ | H02K 16/00 310/59 |
| 2014/0035430 A1* | 2/2014 | Bang | ........................ | H02K 1/04 310/216.113 |

FOREIGN PATENT DOCUMENTS

KR   20010088215 A   9/2001

* cited by examiner

*Primary Examiner* — Joseph L. Perrin
(74) *Attorney, Agent, or Firm* — Valet Patent Service Limited (57) ABSTRACT

The present disclosure discloses an integrated molded structure of an outer tub and a direct drive motor stator of a drum washing machine, including a stator body and an outer tub body that are integrally injection-molded. The stator body and the outer tub body are integrally injection-molded in order to improve the production efficiency of the stator body and the outer tub body and the assembly quality therebetween. The stator body and the outer tub body are integrally injection-molded, without mechanically connecting the stator body and the outer tub body with screws in order to reduce assembly procedures of mechanical connection with the screws, and meanwhile, to reduce the thickness obtained after the stator body and the outer tub body are assembled, thereby reducing the overall thickness of the drum washing machine.

4 Claims, 8 Drawing Sheets

INTEGRATED MOLDED STRUCTURE OF OUTER TUB AND DIRECT DRIVE MOTOR STATOR OF DRUM WASHING MACHINE

TECHNICAL FIELD

The present disclosure relates to a field of technologies of molded structures of drum washing machines, in particular to an integrated molded structure of an outer tub and a direct drive motor stator of a drum washing machine.

BACKGROUND

Generally, a washing way of a drum washing machine is to perform washing by using rotation of a drum driven by a motor and a friction force between laundry in the state that detergent and washing water are placed inside the drum. By using the washing way, the laundry basically cannot be damaged, and will not be intertwined with each other, and the washing effect of beating and rubbing can be achieved.

Figure 1:
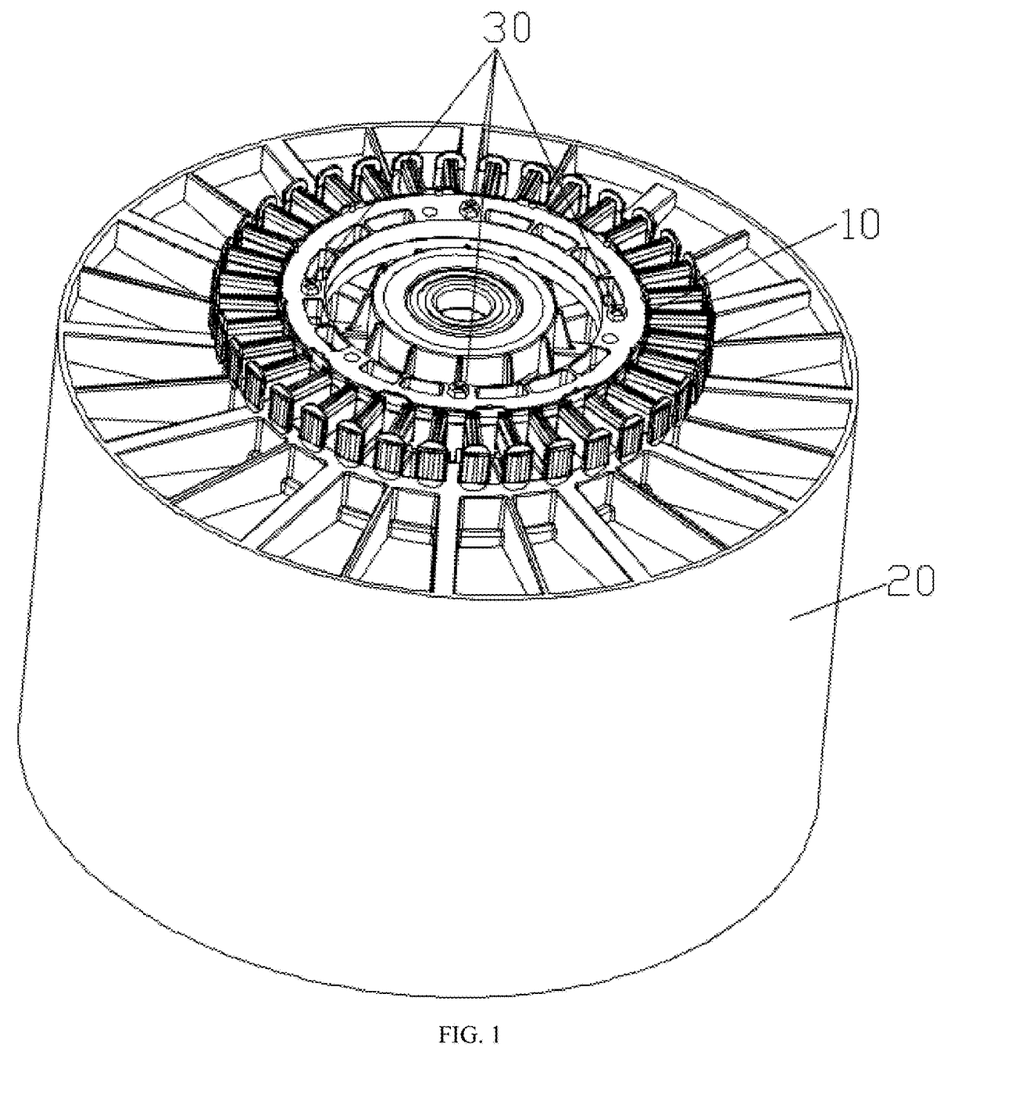
FIG. 1 is a schematic diagram of a connected structure of an outer tub and a direct drive motor stator of a drum washing machine in the prior art.
Figure 2:
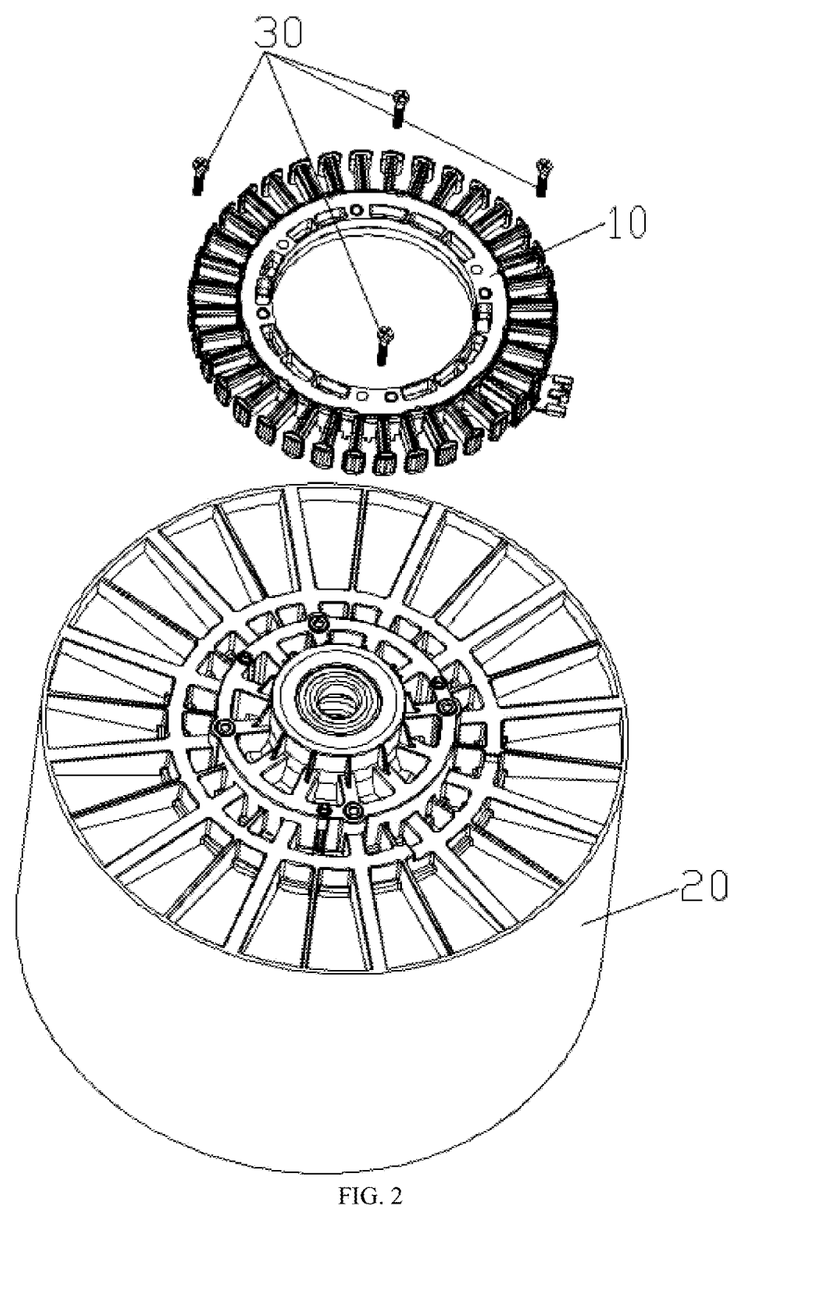
FIG. 2 is a breakdown schematic diagram of an outer tub and a direct drive motor stator of a drum washing machine in the prior art.

Typically, the drum washing machine includes an outer tub configured to store washing water, a drum rotatably installed in the outer tub, and a motor configured to rotate the drum, where the motor includes a stator and a rotor, and generates a rotation force by using electrical energy. The rotor is configured to interact with the stator electromagnetically, and rotates through a force generated by a magnetic field and current flowing through a coil. In the production and installation process of the motor stator and the outer tub, the stator and the outer tub are each separately injection-molded. As shown in FIG. 2, FIG. 2 is a breakdown schematic diagram of a stator body 10 and an outer tub body 20 separately injection-molded. As shown in FIG. 1, the stator body 10 and outer tub body 20 are then fixedly assembled with bolts 30 in a workshop to complete assembly production between the motor stator and the outer tub.

There is a problem in the prior art that a way of fixedly connecting a stator and an outer tub with bolts has a poor installation and use effect. Since a setting error will be inevitably produced in the process that the stator and the outer tub are each separately injection-molded, inadequate bolt connection is likely to occur, and the installation concentricity between the stator and the outer tub cannot be guaranteed. Meanwhile, the bolt installation way is not only labor-consuming and time-consuming, but also affects the assembly efficiency between the stator and the outer tub.

SUMMARY

An object of the present disclosure is to provide an integrated molded structure of an outer tub and a direct drive motor stator of a drum washing machine, in order to solve the problem in the prior art that fixedly connecting a stator and an outer tub with bolts has a poor installation and use effect.

The object of the present disclosure can be achieved by the following technical solution:

An integrated molded structure of an outer tub and a direct drive motor stator of a drum washing machine, including a stator body and an outer tub body that are integrally injection-molded, where:

The stator body is integrally injection-molded directly with the outer tub body, or the stator body is injection-molded alone, and then is integrally injection-molded with the outer tub body.

As a further solution of the present disclosure, the stator body and the outer tub body are integrally injection-molded in order to improve the production efficiency of the stator body and the outer tub body and the assembly quality therebetween.

As a further solution of the present disclosure, the stator body and the outer tub body are integrally injection-molded, without mechanically connecting the stator body and the outer tub body with screws in order to reduce assembly procedures of mechanical connection with the screws, and meanwhile, to reduce the thickness obtained after the stator body and the outer tub body are assembled, thereby reducing the overall thickness of the drum washing machine.

As a further solution of the present disclosure, a wiring terminal is provided on the stator body, and after the stator body and the outer tub body are integrally injection-molded, the wiring terminal is provided on the outer tub body in an integrally molded manner.

As a further solution of the present disclosure, the stator body includes a stator inner ring portion and a stator outer ring portion; a plurality of stator rib portions are connected in an integrally injection-molded manner between an outer circumferential surface of the stator inner ring portion and an inner circumferential surface of the stator outer ring portion; and the stator inner ring portion, the stator rib portion and the stator outer ring portion are placed in a mold of the outer tub body opposite to the stator body, which has a concentricity restriction effect.

As a further solution of the present disclosure, a process hole portion is provided between adjacent stator rib portions.

As a further solution of the present disclosure, the outer tub body includes a tub body inner ring portion and a tub body outer ring portion; a plurality of inner ring tooth portions are connected between an outer circumferential surface of the tub body inner ring portion and an inner circumferential surface of the tub body outer ring portion in an integrally injection-molded manner; the tub body inner ring portion is connected to the stator inner ring portion in an integrally injection-molded manner in a sizing groove portion opened in an axial direction; sizing hole portions communicated with the sizing groove portion are opened in the inner ring tooth portion; and the interior of the sizing hole portion is connected to the stator rib portion in an integrally injection-molded manner.

As a further solution of the present disclosure, a bottom opening end face of the stator outer ring portion is connected to a top opening end face of the tub body outer ring portion in an integrally injection-molded manner, and the inner circumferential surface of the stator outer ring portion is connected to the inner ring tooth portion in an integrally injection-molded manner.

As a further solution of the present disclosure, a tub body process groove portion I is provided between adjacent inner ring tooth portions.

As a further solution of the present disclosure, the stator body further includes several coiling portions connected along the outer circumferential surface of the stator outer ring portion in an integrally injection-molded manner; the coiling portion is configured to provide a coil winding in a wrapping manner; and a heat dissipation structure opposite to the coiling portions is provided in the outer tub body.

As a further solution of the present disclosure, the heat dissipation structure includes a tub body reinforcement ring portion located below the coiling portion; several tub body rib portions I are connected between an inner circumferential surface of the tub body reinforcement ring portion and an outer circumferential surface of the tub body outer ring portion in an integrally injection-molded manner; a tub body process groove portion II is provided between adjacent tub body rib portions I; several tub body rib portions II are connected onto an outer circumferential surface of the tub body reinforcement ring portion in an integrally injection-molded manner; and a tub body process groove portion III is provided between adjacent tub body rib portions II.

As a further solution of the present disclosure, a stator end portion is connected to a tail end of the coiling portion in an integrally injection-molded manner, and the stator end portion is configured to reduce a slit clearance space between adjacent coiling portions.

As a further solution of the present disclosure, a plurality of stator process groove portions are opened in a top opening end face of the stator outer ring portion, and the bottom end face is fixedly connected to the wiring terminal with screws.

The present disclosure has the following advantageous effects:

(1) The stator body and the outer tub body are integrally injection-molded in order to improve the production efficiency of the stator body and the outer tub body and the assembly quality therebetween;

(2) The stator body and the outer tub body are integrally injection-molded, without mechanically connecting the stator body and the outer tub body with screws in order to reduce assembly procedures of mechanical connection with the screws, and meanwhile, to reduce the thickness obtained after the stator body and the outer tub body are assembled, thereby reducing the overall thickness of the drum washing machine;

(3) In the injection molding process of the stator body and the outer tub body, the stator body is injection-molded into a separate mold in advance. After the coil winding is applied onto the stator body, the stator body is placed in an injection mold of the outer tub body, which facilitates that the stator body and the outer tub body are connected in an integrally injection-molded manner. The connection is stable and reliable, which can ensure the installation concentricity between the stator body and the outer tub body. In this application, a conventional installation way of connecting the stator body and the outer tub body with bolts is replaced, and thus, assembly procedures with the bolts can be reduced in order to reduce the assembly error between the stator body and the outer tub body, and help to improve the assembly efficiency between the stator and the outer tub, thereby ensuring the assembly quality;

(4) The design of an injection-molded structure of the stator body is reasonable, which facilitates limiting of the injection molding of an integrated structure of the stator inner ring portion, the stator rib portion and the stator outer ring portion through a structural shape of the mold. When the stator inner ring portion, the stator rib portion and the stator outer ring portion are connected to the outer tub body in an integrally injection molded manner, the stator inner ring portion, the stator rib portion and the stator outer ring portion not only can enhance the connection strength with the outer tub body, but also can ensure the concentricity of the integral injection molding production of the stator body and the outer tub body, thus ensuring the injection molding quality between the stator body and the outer tub body;

(5) In the integrated injection molding production process of the stator body and the outer tub body, the tub body reinforcement ring portion, the tub body rib portion I, and the tub body rib portion II play a role in enhancing the injection molding strength of an assembly molding surface of the outer tub body. Meanwhile, the process groove portions II and the process groove portions III are correspondingly provided below the coiling portions. The heat generated by the operation of the coil winding on the coiling portion is easy to discharge from the process groove portions II and the process groove portions III, thus avoiding that the heat is accumulated between the stator body and the outer tub body; and When the injection-molded structure of the stator body is designed, the stator end portion is connected to the tail end of the coiling portion in an integrally injection-molded manner. The stator end portion is configured to reduce slit clearance spaces between adjacent coiling portions, which can prevent the phenomenon that a cracking sound is produced by air friction in the slit clearance space between adjacent coiling portions, thereby playing role of reducing noise.

BRIEF DESCRIPTION OF THE DRAWINGS

The present disclosure is further described below in conjunction with the accompanying drawings.

Numeral references: 10. Stator body; 100. Stator inner ring portion; 101. Stator outer ring portion; 102. Stator rib portion; 103. Process hole portion; 104. Coiling portion; 105. Stator end portion; 106. Stator process groove portion;

20. Outer tub body; 200. Tub body inner ring portion; 201. Inner ring tooth portion; 202. Sizing groove portion; 203. Sizing hole portion; 204. Tub body process groove portion I; 205. Tub body outer ring portion; 206. Tub body rib portion I; 207. Tub body reinforcement ring portion; 208. Tub body process groove portion II; 209. Tub body rib portion II; 210. Tub body process groove portion III;

30. Bolt; and

40. Wiring terminal.

DETAILED DESCRIPTION

The technical solutions in the embodiments of the present disclosure will now be described clearly and fully hereinafter with reference to the accompanying drawings in the embodiments of the present disclosure. Apparently, the embodiments described are merely a few, but not all embodiments of the present disclosure. All other embodiments obtained by a person of ordinary skill in the art based on the embodiments of the present disclosure without creative efforts shall fall within the protection scope of the present disclosure.

In the description of the present disclosure, it should be understood that the term indicating orientation or positional relationship is based on the orientation or positional relationship shown in the attached drawings, which is only for the convenience of describing the present disclosure and simplifying the description, but not for indicating or implying that the apparatus or element referred to must have a specific orientation, be constructed and operated in a specific orientation, which therefore cannot be understood as a restriction on the present disclosure. In the description of the present disclosure, "a plurality of" and "several" mean at least two, e.g., two, three, etc., unless otherwise specifically defined.

Figure 3:
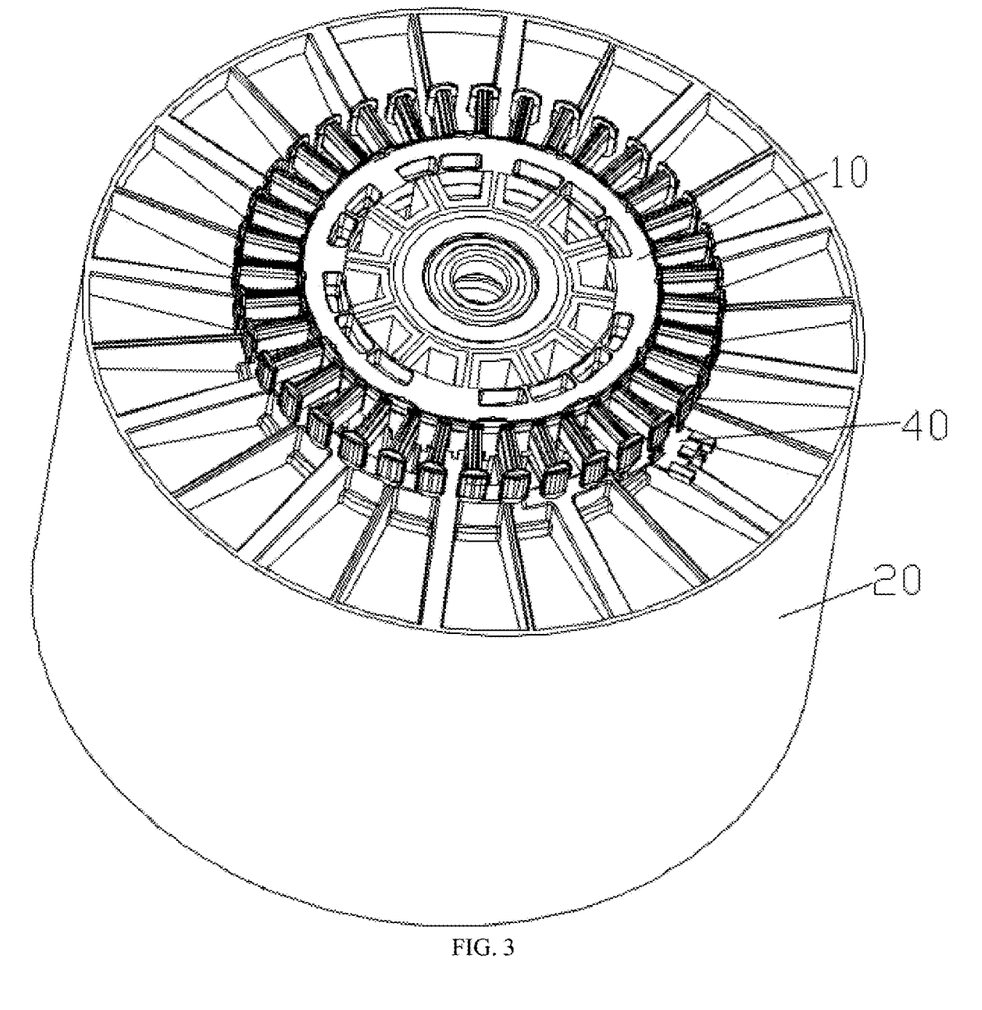
FIG. 3 is a structural schematic diagram of the present disclosure.
Figure 4:
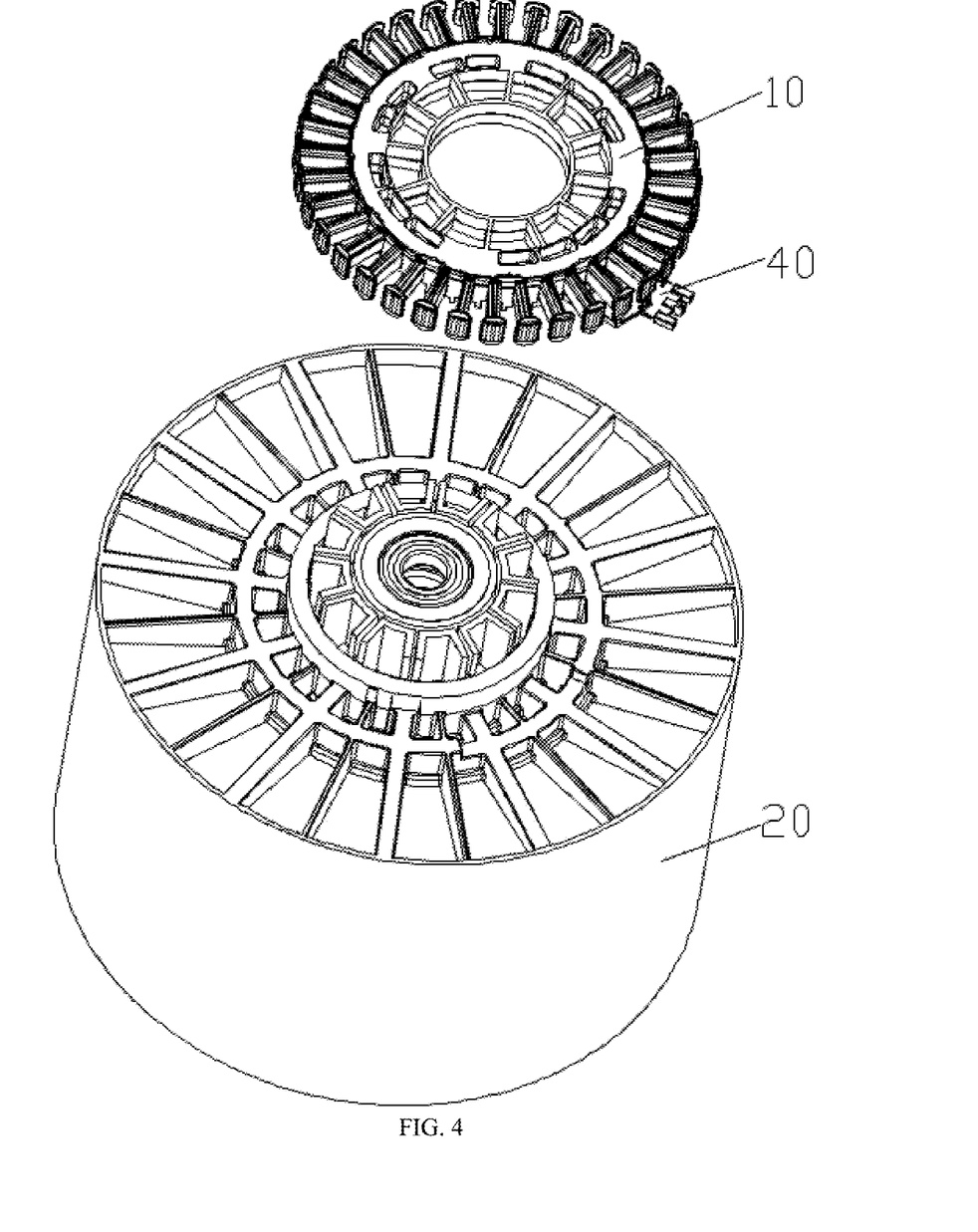
FIG. 4 is a breakdown schematic diagram of a stator body and an outer tub body of the present disclosure.

Referring to FIGS. 3 and 4, the present disclosure relates to an integrated molded structure of an outer tub and a direct drive motor stator of a drum washing machine, including a stator body 10 and an outer tub body 20 that are integrally injection-molded, where the stator body 10 is integrally injection-molded directly with the outer tub body 20, or the stator body 10 is injection-molded alone, and then is integrally injection-molded with the outer tub body 20.

The stator body 10 and the outer tub body 20 are integrally injection-molded in order to improve the production efficiency of the stator body 10 and the outer tub body 20 and the assembly quality therebetween.

The stator body 10 and the outer tub body 20 are integrally injection-molded, without mechanically connecting the stator body 10 and the outer tub body 20 with screws in order to reduce assembly procedures of mechanical connection with the screws, and meanwhile, to reduce the thickness obtained after the stator body 10 and the outer tub body 20 are assembled, thereby reducing the overall thickness of the drum washing machine.

A wiring terminal 40 is provided on the stator body 10, and the stator body 10 and the outer tub body 20 are integrally injection-molded, the wiring terminal 40 is provided on the outer tub body 20 in an integrally molded manner.

Hereinafter, the injection molding engagement between the stator body 10 and the outer tub body 20 will be explained.

In the assembly process of the stator body 10 and the outer tub body 20, the stator body 10 is injection-molded into a separate mold in advance. After the coil winding is applied onto the stator body 10, the stator body 10 is placed in an injection mold of the outer tub body 20, which facilitates that the stator body 10 and the outer tub body 20 are connected in an integrally injection-molded manner. The connection is stable and reliable, which can ensure the installation concentricity between the stator body 10 and the outer tub body 20. In this application, a conventional installation way of connecting the stator body 10 and the outer tub body 20 with bolts 30 is replaced, and thus, assembly procedures with the bolts 30 can be reduced in order to reduce the assembly error between the stator body 10 and the outer tub body 20, and help to improve the assembly efficiency between the stator and the outer tub, thereby ensuring the assembly quality.

As shown in FIGS. 5 to 8, the stator body 10 includes a stator inner ring portion 100 and a stator outer ring portion 101; a plurality of stator rib portions 102 are connected in an integrally injection-molded manner between an outer circumferential surface of the stator inner ring portion 100 and an inner circumferential surface of the stator outer ring portion 101; and the stator inner ring portion 100, the stator rib portions 102 and the stator outer ring portion 101 are placed in a mold of the outer tub body 20 opposite to the stator body 10, which has a concentricity restriction effect. In the process of performing injection molding on the stator body 10 in the separate mold in advance, the injection molding of an integrated structure of the stator inner ring portion 100, the stator rib portions 102 and the stator outer ring portion 101 through a structural shape of the mold is facilitated. When the stator inner ring portion 100, the stator rib portions 102 and the stator outer ring portion 101 are connected to the outer tub body 20 in an integrally injection molded manner, the stator inner ring portion 100, the stator rib portions 102 and the stator outer ring portion 101 not only enhance the connection strength with the outer tub body 20, but also ensure the concentricity of the integral injection molding production of the stator body 10 and the outer tub body 20.

Figure 5:
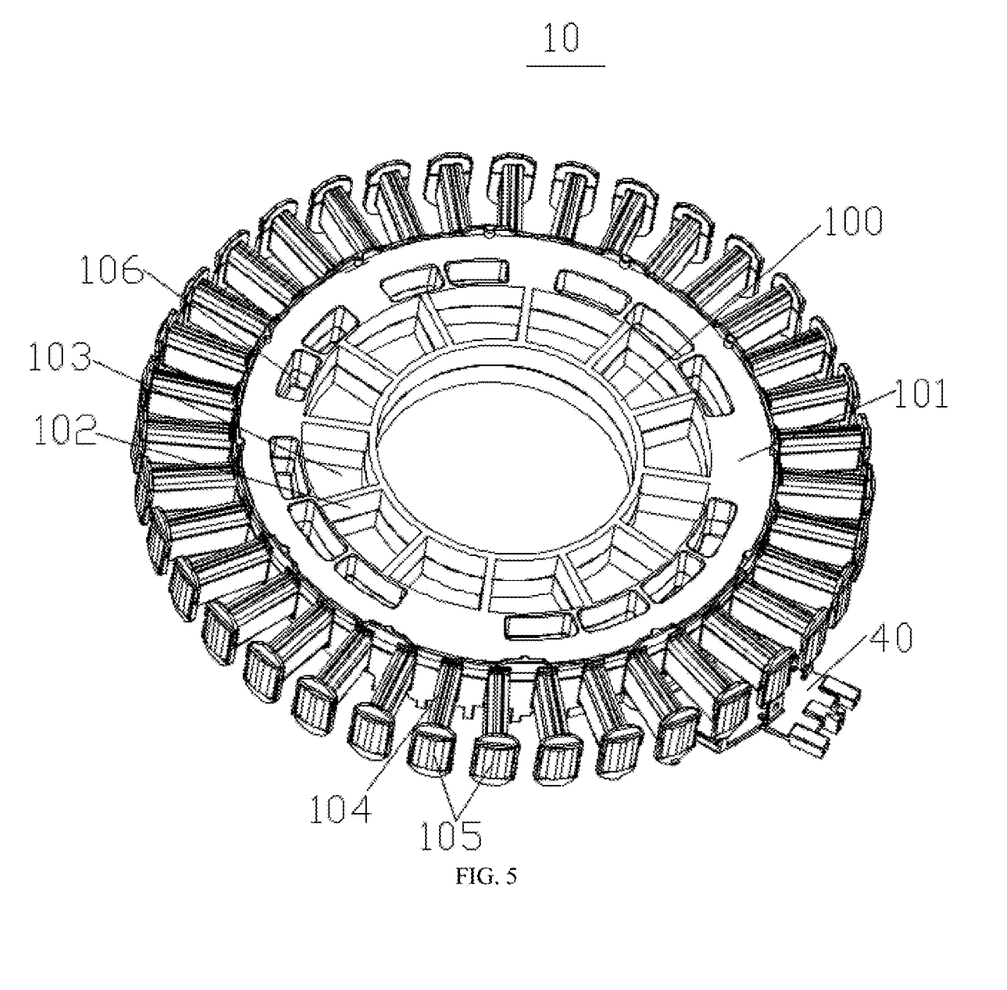
FIG. 5 is a structural schematic diagram of a stator body of the present disclosure.

As shown in FIG. 5, a process hole portion 103 is provided between adjacent stator rib portions 102. The provided process hole portion 103 facilitates that inner ring tooth portions 201 are connected in an integrally injection-molded manner in the injection mold of the outer tub body 20, and the provided process hole portion 103 also reduces the use of injection feed liquid of the stator body 10, thereby reducing the injection production cost of the stator body 10 and reducing the weight of the stator body 10.

Figure 6:
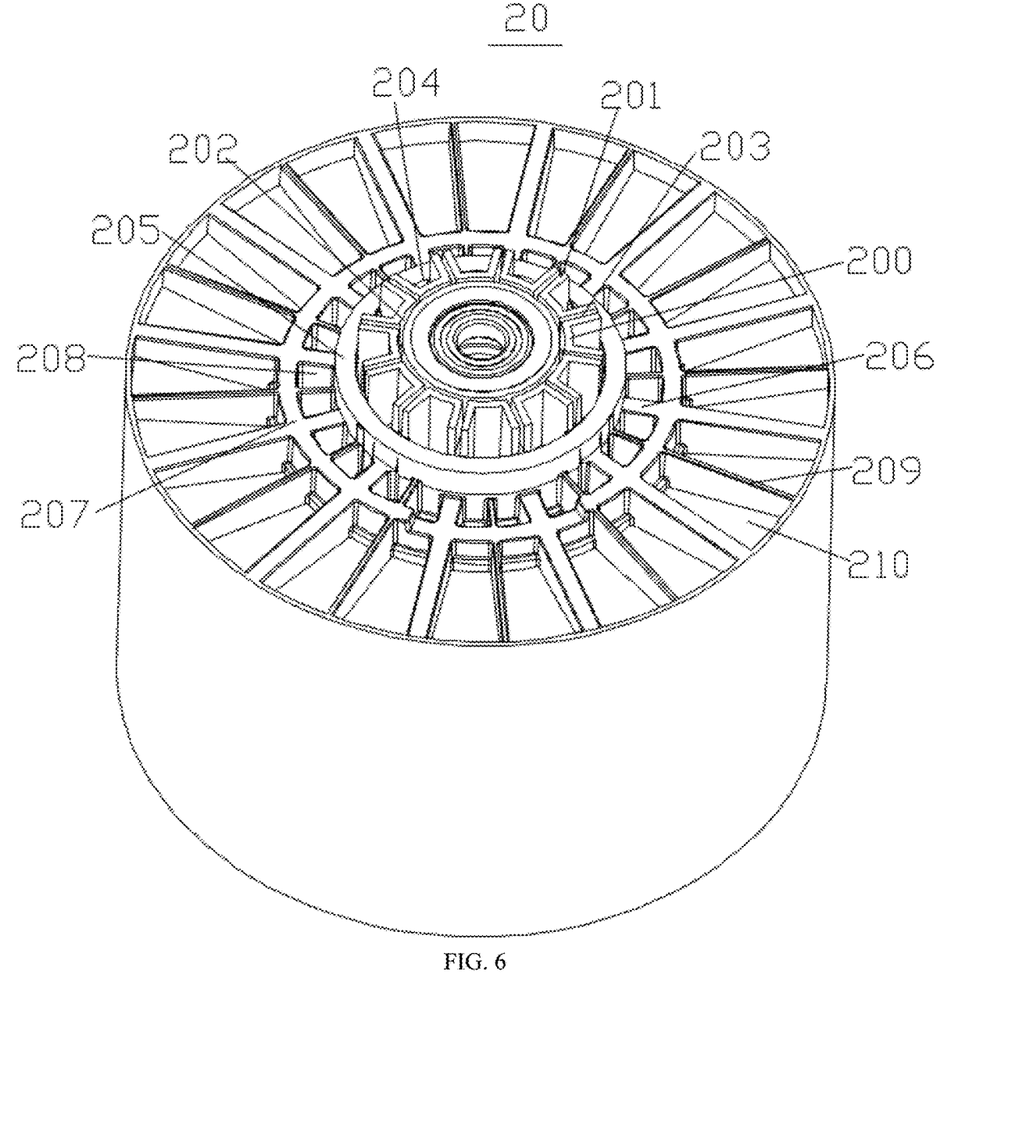
FIG. 6 is a schematic diagram of an outer tub body of the present disclosure.

As shown in FIG. 6, the outer tub body 20 includes a tub body inner ring portion 200 and a tub body outer ring portion 205; a plurality of inner ring tooth portions 201 are connected between an outer circumferential surface of the tub body inner ring portion 200 and an inner circumferential surface of the tub body outer ring portion 205 in an integrally injection-molded manner; the tub body inner ring portion 200 is connected to the stator inner ring portion 100 in an integrally injection-molded manner by a sizing groove portion 202 opened in an axial direction; sizing hole portions 203 communicated with the sizing groove portion 202 are opened in the inner ring tooth portion 201; and the interior of the sizing hole portion 203 is connected to the stator rib portions 102 in an integrally injection-molded manner. When the stator body 10 is placed in the mold of the outer tub body 20, an injection space is limited between the mold of the outer tub body 20 and the stator body 10 to facilitate that the tub body inner ring portion 200, the tub body inner ring tooth portion 201, and the tub body outer ring portion 205 are injected-molded. After the stator body 10 and the outer tub body 20 are integrally injection-molded, the stator inner ring portion 100 is connected in the sizing groove portion 202 of the tub body inner ring in a tied manner, and the stator rib portions 102 in a circumferential direction are placed inside the inner ring tooth portion 201, so that the tie strength in the circumferential direction between the stator body 10 and the outer tub body 20 is consistent, and setting can be realized, which ensures the concentricity of the injection molding between the stator body 10 and the outer tub body 20, thus ensuring the injection quality between the stator body 10 and the outer tub body 20.

As shown in FIGS. 3 and 6, a bottom opening end face of the stator outer ring portion 101 is connected to a top opening end face of the tub body outer ring portion 205 in an integrally injection-molded manner, and the inner circumferential surface of the stator outer ring portion 101 is connected to the inner ring tooth portion 201 in an integrally injection-molded manner. By using the stator outer ring portion 101 as a connection contact surface for injection molding of the tub body outer ring portion 205, the connection strength between the stator body 10 and the outer tub body 20 is further strengthened, and the injection molding quality of the tub body outer ring can be ensured.

As shown in FIG. 6, a tub body process groove portion I 204 is provided between adjacent inner ring tooth portions 201. The provided tub body process groove portion I facilitates that inner ring tooth portions 201 are connected in an integrally injection-molded manner in the injection mold of the outer tub body 20, and the provided tub body process groove portion I also reduces the use of injection feed liquid of the outer tub body 20, thereby reducing the injection production cost of the outer tub body 20 and reducing the weight of the outer tub body 20.

As shown in FIG. 5, the stator body 10 further includes several coiling portions 104 connected along the outer circumferential surface of the stator outer ring portion 101 in an integrally injection-molded manner; the coiling portion 104 is configured to provide a coil winding in a wrapping manner; and a heat dissipation structure opposite to the coiling portions 104 is provided in the outer tub body 20. The coiling portion 104 and the stator outer ring portion 101 are integrally injection-molded to ensure their molding quality, and facilitate that the coil winding is wrapped in the clearance space between adjacent coiling portions 104. When used in conjunction with the motor rotor, the stator is configured to interact with the stator electromagnetically, and the rotor rotates through a force generated by a magnetic field and current flowing through the coil winding. In the operation process with the current produced electromagnetically, the coil winding generates heat, and the stator body 10 and the outer tub body 20 are integrated by injection molding, and a heat dissipation mechanism provided on the outer tub body 20 is configured to quickly dissipate heat from the coil winding on the stator body 10.

As shown in FIG. 6, the heat dissipation structure includes a tub body reinforcement ring portion 207 located below the coiling portion 104; several tub body rib portions I 206 are connected between an inner circumferential surface of the tub body reinforcement ring portion 207 and an outer circumferential surface of the tub body outer ring portion 205 in an integrally injection-molded manner; a tub body process groove portion II 208 is provided between adjacent tub body rib portions I 206; several tub body rib portions II 209 are connected onto an outer circumferential surface of the tub body reinforcement ring portion 207 in an integrally injection-molded manner; and a tub body process groove portion III 210 is provided between adjacent tub body rib portions II 209. In the integrated injection molding process of the stator body 10 and the outer tub body 20, the tub body reinforcement ring portion 207, the tub body rib portion I 206, and the tub body rib portion II 209 play a role in enhancing the injection molding strength of an assembly molding surface of the outer tub body 20. Meanwhile, the process groove portions II and the process groove portions III are correspondingly provided below the coiling portions 104. The heat generated by the operation of the coil winding on the coiling portion 104 is easy to discharge from the process groove portions II and the process groove portions III, thus avoiding that the heat is accumulated between the stator body 10 and the outer tub body 20.

As shown in FIG. 5, a stator end portion 105 is connected to a tail end of the coiling portion 104 in an integrally injection-molded manner, and the stator end portion 105 is configured to reduce a slit clearance space between adjacent coiling portions 104. By making the specification size of the integrally injection-molded stator end portion 105 larger ththe size of a tail end face of the coiling portion 104, the slit clearance space between adjacent coiling portions 104 can be reduced. During motor drives, there is a situation that the polarity of each slit clearance space between adjacent coiling portions 104 will be rapidly converted, and thus, resonance will occur in each slit clearance space between adjacent coiling portions 104, which makes the noise increased. The slit clearance space between adjacent coiling portions 104 is reduced by the stator end portion 105, which can prevent the phenomenon that a cracking sound is produced by air friction in the slit clearance space between adjacent coiling portions 104, thereby playing role of reducing the noise.

Figure 7:
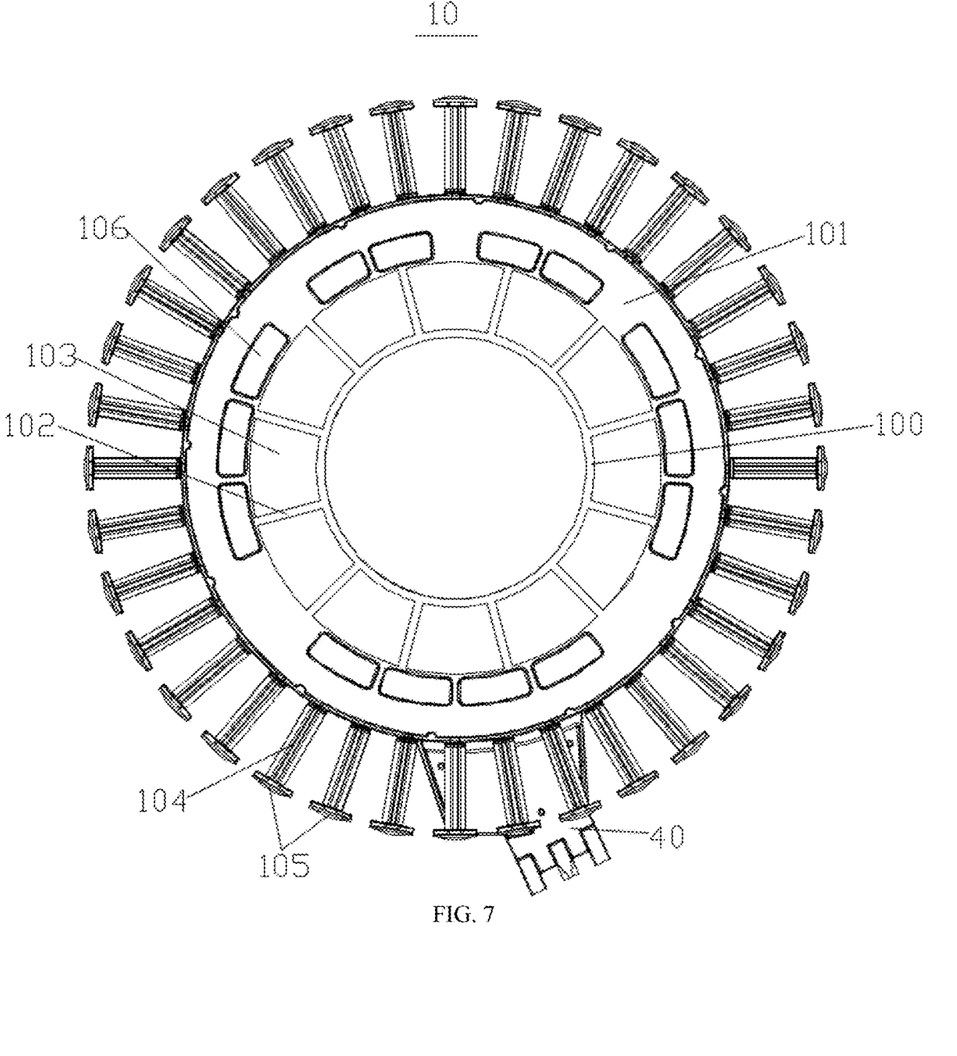
FIG. 7 is a top view of a stator body of the present disclosure.
Figure 8:
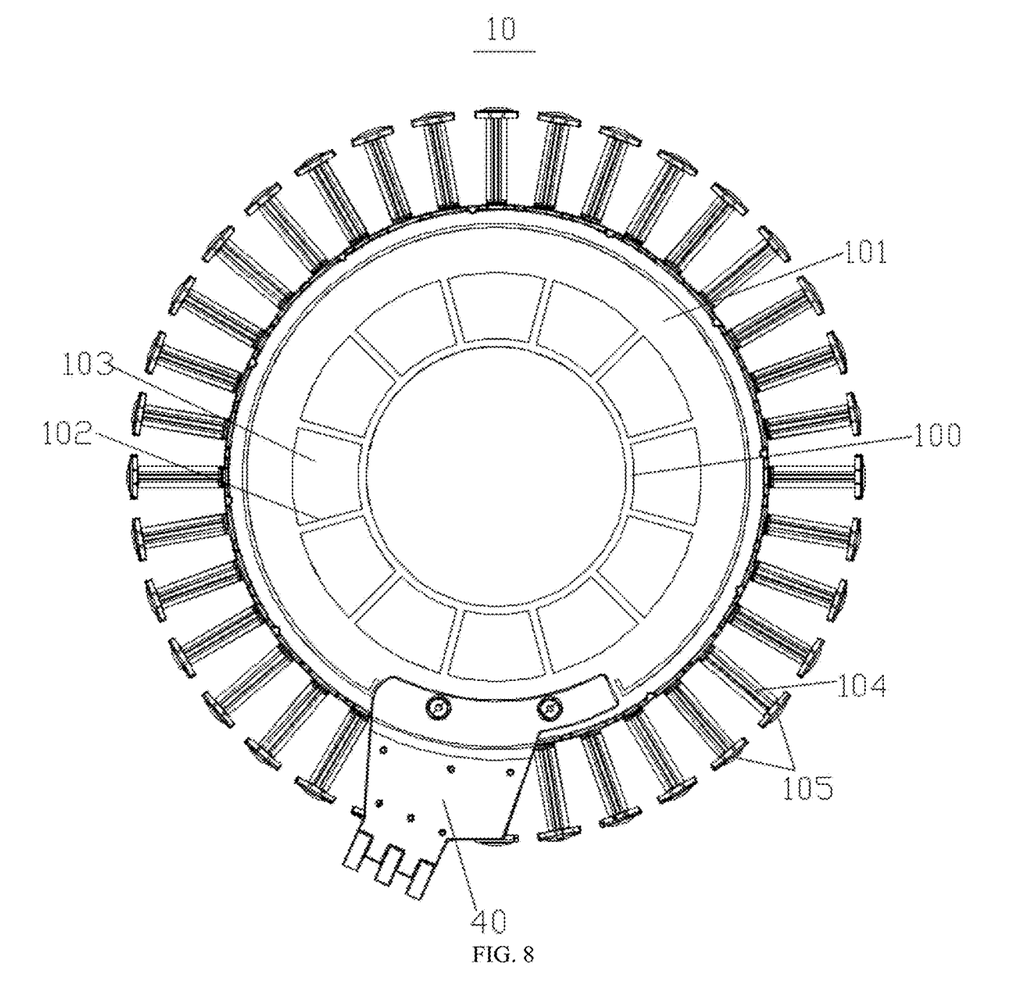
FIG. 8 is a bottom view of a stator body of the present disclosure.

As shown in FIGS. 7 and 8, a plurality of stator process groove portions 106 are opened in a top opening end face of the stator outer ring portion 101. When the stator body 10 is placed in the injection mold of the outer tub body 20, the assembly position of the stator body 10 can be easily limited and stabilized by the plurality of stator process groove portions 106, and thus, the injection molding quality between the stator body 10 and the outer tub body 20 can be ensured. Moreover, the provided stator process groove portions 106 reduces the use of the injecting feed liquid of the stator body 10, thereby reducing the injection production cost of the stator body 10 and reducing the weight of the stator body 10. The bottom end face is fixedly connected to the wiring terminal 40 with screws, and the wiring terminal 40 is convenient to install.

One embodiment of the present disclosure has been described in detail above, but it is only a preferred embodiment of the present disclosure, which therefore cannot be considered as limiting the scope of implementation of the present disclosure. All equal changes and improvements, etc., made in accordance with the scope of the application for the present disclosure shall still fall within the patent coverage of the present disclosure.

What is claimed is:

1. An integrated molded structure of an outer tub and a direct drive motor stator of a drum washing machine, comprising a stator body and an outer tub body that are integrally injection-molded; wherein:

the stator body is integrally injection-molded directly with the outer tub body, or the stator body is injection-molded alone, and then is integrally injection-molded with the outer tub body;

the stator body comprises a stator inner ring portion and a stator outer ring portion; a plurality of stator rib portions are connected in an integrally injection-molded manner between an outer circumferential surface of the stator inner ring portion and an inner circumferential surface of the stator outer ring portion; and the stator inner ring portion, the stator rib portions and the stator outer ring portion are placed in a mold of the outer tub body opposite to the stator body, which has a concentricity restriction effect;

the outer tub body comprises a tub body inner ring portion and a tub body outer ring portion; a plurality of inner ring tooth portions are connected between an outer circumferential surface of the tub body inner ring portion and an inner circumferential surface of the tub body outer ring portion in an integrally injection-molded manner; the tub body inner ring portion is connected to the stator inner ring portion in an integrally injection-molded manner in a sizing groove portion opened in an axial direction; sizing hole portions communicated with the sizing groove portion are opened in the inner ring tooth portion; and the interior of the sizing hole portion is connected to the stator rib portions in an integrally injection-molded manner; and a bottom opening end face of the stator outer ring portion is connected to a top opening end face of the tub body outer ring portion in an integrally injection-molded manner, and the inner circumferential surface of the stator outer ring portion is connected to the inner ring tooth portion in an integrally injection-molded manner.

2. The integrated molded structure of the outer tub and the direct drive motor stator of the drum washing machine according to 1, wherein the stator body and the outer tub body are integrally injection-molded in order to improve a production efficiency of the stator body and the outer tub body and an assembly quality therebetween.

3. The integrated molded structure of the outer tub and the direct drive motor stator of the drum washing machine according to 1, wherein the stator body and the outer tub body are integrally injection-molded, without mechanically connecting the stator body and the outer tub body with screws in order to reduce assembly procedures of mechanical connection with the screws, and meanwhile, to reduce a thickness obtained after the stator body and the outer tub body are assembled, thereby reducing an overall thickness of the drum washing machine.

4. The integrated molded structure of the outer tub and the direct drive motor stator of the drum washing machine according to 1, wherein a wiring terminal is provided on the stator body, and the stator body and the outer tub body are integrally injection-molded, facilitating that the wiring terminal is provided on the outer tub body in an integrally molded manner.

* * * * *